(12) United States Patent
Fujimoto

(10) Patent No.: US 6,685,202 B2
(45) Date of Patent: Feb. 3, 2004

(54) SUBFRAME CONSTRUCTION FOR FRONT SUSPENSION

(75) Inventor: Naomi Fujimoto, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 120 days.

(21) Appl. No.: 10/053,217

(22) Filed: Nov. 7, 2001

(65) Prior Publication Data

US 2002/0074788 A1 Jun. 20, 2002

(30) Foreign Application Priority Data

Nov. 7, 2000 (JP) ........................................ 2000-338742

(51) Int. Cl.7 .............................................. B62D 21/00
(52) U.S. Cl. ................................ 280/124.109; 180/311
(58) Field of Search ................... 280/124.109, 124.134, 280/124.135, 124.136, 785, 788; 180/311

(56) References Cited

U.S. PATENT DOCUMENTS

| | | | | | |
|---|---|---|---|---|---|
| 3,512,800 | A | * | 5/1970 | Winsen | 280/788 |
| 4,184,697 | A | * | 1/1980 | Suzuki et al. | 280/124.109 |
| 4,501,436 | A | * | 2/1985 | Ishida | 280/124.108 |
| 4,762,336 | A | * | 8/1988 | Ogawa et al. | 280/124.15 |
| 4,772,044 | A | * | 9/1988 | Booher | 280/124.134 |
| 4,906,018 | A | * | 3/1990 | Kijima et al. | 280/124.109 |
| 5,181,736 | A | * | 1/1993 | Kokubun | 280/124.109 |
| 5,562,308 | A | * | 10/1996 | Kamei et al. | 280/788 |
| 6,349,953 | B1 | * | 2/2002 | Yoshihira et al. | 280/781 |
| 6,511,096 | B1 | * | 1/2003 | Kunert et al. | 280/785 |

FOREIGN PATENT DOCUMENTS

JP          03054009 A  *  3/1991  ............ B60G/3/20

* cited by examiner

Primary Examiner—Paul N. Dickson
Assistant Examiner—Laura B. Rosenberg
(74) Attorney, Agent, or Firm—Alston & Bird LLP

(57) ABSTRACT

A subframe construction for a front suspension is provided that increases suspension arm attachment strength in the event of a front collision. The subframe includes a front cross member at the front part of a vehicle body; a rear cross member on the rear side of the front cross member; and a pair of right and left subframe bodies connecting these cross members to each other. The subframe body has upper and lower panels forming a hollow portion therebetween. A rear arm bracket is installed along the rear outer side in the vehicle width direction of the lower panel of the subframe body. The panels include portions ranging from the lower panel face on which the rear arm bracket is mounted to the rear side of the lower panel formed substantially into a spherical shell shape.

7 Claims, 10 Drawing Sheets

SUBFRAME CONSTRUCTION FOR FRONT SUSPENSION

BACKGROUND OF THE INVENTION

1. Field of the Invention

The present invention relates to a subframe construction for a front suspension.

2. Description of the Related Art

As shown in FIG. 13, a subframe body 101 of a conventional subframe for holding a front suspension is constructed so that an upper panel 103 having a chevron shape in cross section and a lower panel 105 having an inverted chevron shape in cross section are joined to each other so as to form a hollow portion 107 between the panels 103 and 105. On a face 105a on the outside in the vehicle width direction of the lower panel 105, there is disposed a suspension arm mounting bracket 109 formed by bending a plate material substantially into a U shape. A shown in the figure, in front of and behind the attachment portion of the suspension arm mounting bracket 109, work spaces are secured to perform bolt tightening work when a suspension arm is installed to the bracket 109.

In this case, in a case where stiffness in the longitudinal direction of the bracket 109 is not secured sufficiently, when an impact force is applied to a vehicle from the front side, it is difficult to absorb impact energy caused by a load transmitted from a tire. Therefore, stiffness of a degree such as to be capable of absorbing the impact energy must be secured by sufficiently increasing the plate thickness of the bracket 109, which results in an increase in vehicle weight, leading to an increase in cost.

Also, since the bracket 109 is disposed on the side face of the subframe body 101, the length of the suspension arm cannot be increased.

SUMMARY OF THE INVENTION

The present invention has been made to solve the above problems, and accordingly an object thereof is to provide a subframe construction for a front suspension that increases the suspension arm attachment strength at the time of front collision.

To achieve the above object, the present invention provides a subframe construction for a front suspension, comprising a front cross member disposed in the vehicle width direction at the front part of a vehicle body; a rear cross member disposed in the vehicle width direction on the rear side of the front cross member; a pair of right and left subframe bodies for connecting these cross members to each other, the subframe body having an upper panel and a lower panel forming a hollow portion therebetween; and a suspension arm mounting member installed to the rear side on the outside in the vehicle width direction of the lower panel constituting the subframe body, wherein the panel shapes of the upper panel and lower panel ranging from the lower panel face on which the suspension arm mounting member is mounted on the lower panel to the rear side of the lower panel are formed substantially into a spherical shell shape.

The above-described spherical shell shape means a spherical surface shape drawn with the suspension arm mounting member being the center, being a shape which is formed by dividing a hemisphere opening downward into about one-fourth and whose front side and outside in the vehicle width direction are open. This spherical shell shape is not limited to a completely spherical shape, and may be a somewhat curved shape such as an egg shape. To the suspension arm mounting member is installed a suspension arm, and the suspension arm is provided with a wheel and a tire. When an impact force is applied to a vehicle from the front side, the front tire is subjected to an impact load, and this impact load is transmitted from the suspension arm to the mounting face of the subframe body via the suspension arm mounting member. Therefore, by forming this mounting face substantially into a spherical shell shape, the impact load imposed on the mounting face is distributed uniformly, so that the strength of the subframe body increases. As a result, even when an impact force is applied to the vehicle, the subframe body is less damaged.

Also, in one mode of the present invention, a lower side portion of the mounting face of the lower panel formed substantially into a spherical shell shape is depressed toward the inside in the vehicle width direction, and the suspension arm mounting member is installed on the depressed panel face.

Further, in another mode of the present invention, the longitudinal position of the panel face on which the suspension arm mounting member is installed is substantially aligned with the position of the rear cross member.

In still another mode of the present invention, the suspension arm mounting member and the panel face of the lower panel located on the rear side of the mounting member are connected to each other by a first reinforcing member. Also, in still another mode of the present invention, the panel face of the lower panel located on the rear side of the suspension arm mounting member and the upper panel are connected longitudinally to each other by a second reinforcing member.

Therefore, the impact load imposed on the suspension arm mounting member is also distributed to the first and second reinforcing members, so that the strength of the subframe body is further increased.

Specifically, a component force in the vehicle width direction of the load imposed on the suspension arm mounting member is taken by the rear cross member, and a component force in the vehicle longitudinal direction of the load can be taken by the lower panel and further the upper panel via the first and second reinforcing members. Further, since the upper panel and lower panel between the rear cross member and the second reinforcing member are formed substantially into a spherical shell shape, the load can be distributed uniformly.

In still another mode of the present invention, as the first reinforcing member, a rod-like or plate-like tie down hook can be used.

Although the tie down hook is usually used to fix a vehicle at the time of transportation of vehicle, the tie down hook can be used effectively as the first reinforcing member.

In still another mode of the present invention, as the second reinforcing member, a cylindrical reinforcing pipe can be used. The cylindrical reinforcing pipe is arranged so that the axis thereof is substantially aligned with the centers of the mounting holes in the rear arm bracket.

The reinforcing pipe is formed so as to have an inside diameter such that an attaching bolt, a washer, and a tool such as a socket wrench can pass through.

In the subframe construction for a front suspension in accordance with the present invention, comprising a front cross member disposed in the vehicle width direction at the front part of a vehicle body; a rear cross member disposed in the vehicle width direction on the rear side of the front cross member; a pair of right and left subframe bodies for connecting these cross members to each other, the subframe body having an upper panel and a lower panel forming a hollow portion therebetween; and a suspension arm mounting member installed to the rear side on the outside in the vehicle width direction of the lower panel constituting the subframe body, the panel shapes of the upper panel and lower panel ranging from the lower panel face on which the suspension arm mounting member is mounted on the lower panel to the rear side of the lower panel are formed substantially into a spherical shell shape. Therefore, a component force in the vehicle width direction of the load imposed on the suspension arm mounting member is taken by the rear cross member, and a component force in the vehicle longitudinal direction of the load can be taken by the lower panel and further the upper panel via the first and second reinforcing members. Further, since the upper panel and lower panel are formed substantially into a spherical shell shape, the impact load imposed on the mounting face is distributed uniformly. Therefore, even when an impact force is applied to the vehicle, the subframe body is less damaged.

Also, according to one mode of the present invention, a lower side portion of the mounting face of the lower panel formed substantially into a spherical shell shape is depressed toward the inside in the vehicle width direction, and the suspension arm mounting member is installed on the depressed panel face. Therefore, the suspension arm mounting member can be provided closer to the inside in the vehicle width direction, so that the length of the suspension arm can be increased. Also, even if the suspension arm mounting member is provided closer to the inside in the vehicle width direction, the attachment position does not lower, and a downward offset with respect to the vehicle body side attachment portion does not increase, so that the height from the road surface can be secured.

Further, according to another mode of the present invention, the longitudinal position of the panel face on which the suspension arm mounting member is installed is substantially aligned with the position of the rear cross member.

In still another mode of the present invention, the suspension arm mounting member and the panel face of the lower panel located on the rear side of the mounting member are connected to each other by the first reinforcing member. Also, in still another mode of the present invention, the panel face of the lower panel located on the rear side of the suspension arm mounting member and the upper panel are connected longitudinally to each other by the second reinforcing member.

Therefore, the impact load imposed on the suspension arm mounting member is also distributed to the first and second reinforcing members, so that the strength of the subframe body is further increased.

Further, in still another mode of the present invention, as the first reinforcing member, the rod-like or plate-like tie down hook can be used. Although the tie down hook is usually used to fix a vehicle at the time of transportation of vehicle, the tie down hook can be used effectively as the first reinforcing member.

In still another mode of the present invention, as the second reinforcing member, the cylindrical reinforcing pipe can be used. The cylindrical reinforcing pipe is arranged so that the axis thereof is substantially aligned with the centers of the mounting holes in the rear arm bracket. Therefore, an attaching bolt, a washer, and a tool such as a socket wrench are passed through the inside diameter of the reinforcing pipe to efficiently perform work for installing the suspension arm to the mounting member.

DETAILED DESCRIPTION OF PREFERRED EMBODIMENTS

An embodiment of the present invention will now be described in detail with reference to the accompanying drawings.

Figure 1:
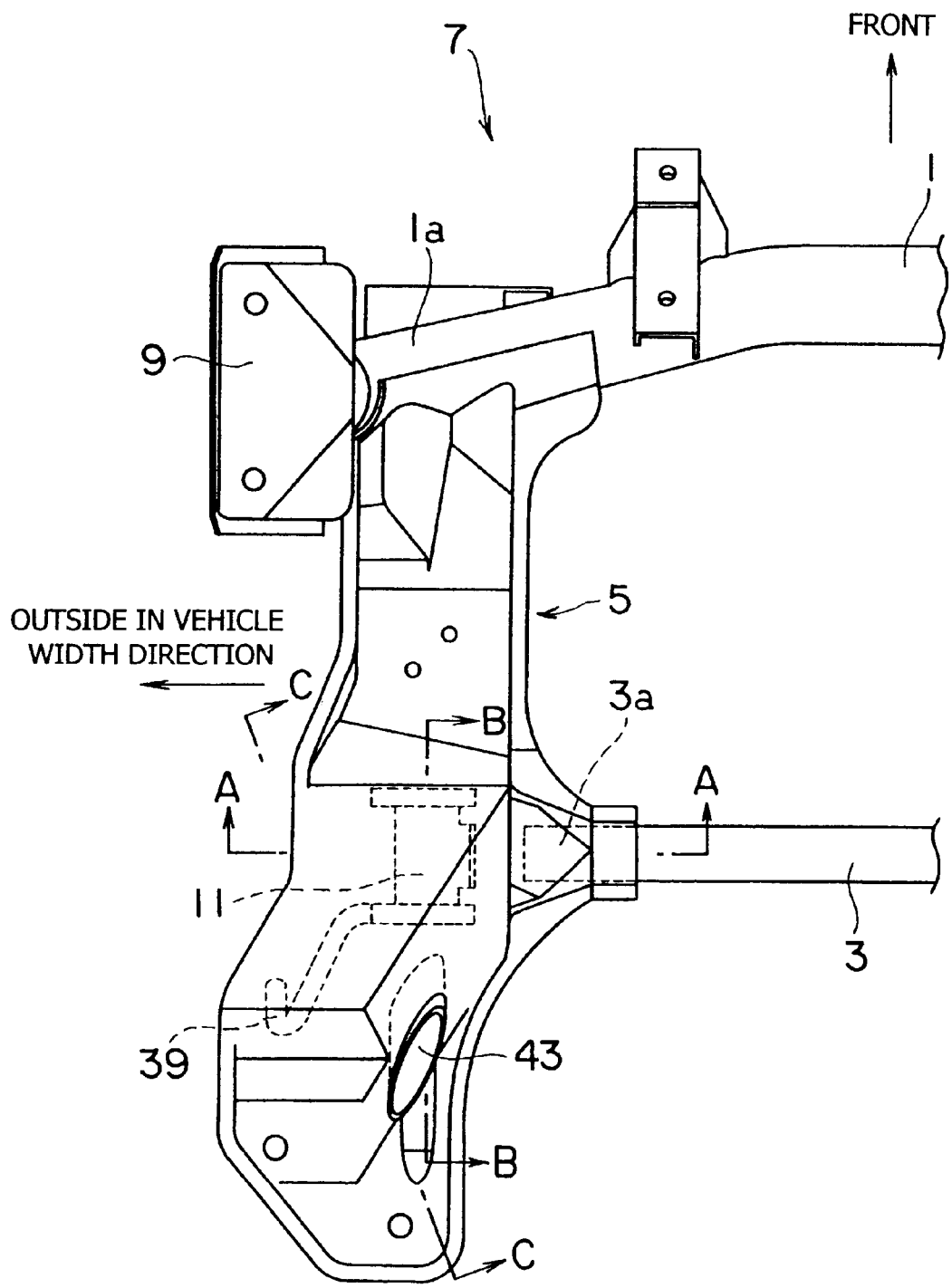
FIG. 1 is a plan view showing a subframe having a construction in accordance with the present invention.

As shown in FIG. 1, at the front part of a vehicle body, a front cross member 1 and a rear cross member 3 are disposed in the vehicle width direction, and subframe bodies 5 are provided in the longitudinal direction to connect the end portions 1a and 3a of these cross members 1 and 3 to each other. The front cross member 1, the rear cross member 3, and the subframe bodies 5 constitute a subframe 7 substantially having a shape of parallel crosses. At the end of the front cross member 1 is provided a vehicle body mounting bracket 9 that is also used as an upper arm bracket. The rear cross member 3 is disposed at almost the same position as the longitudinal position of a rear arm bracket 11.

Figure 2:
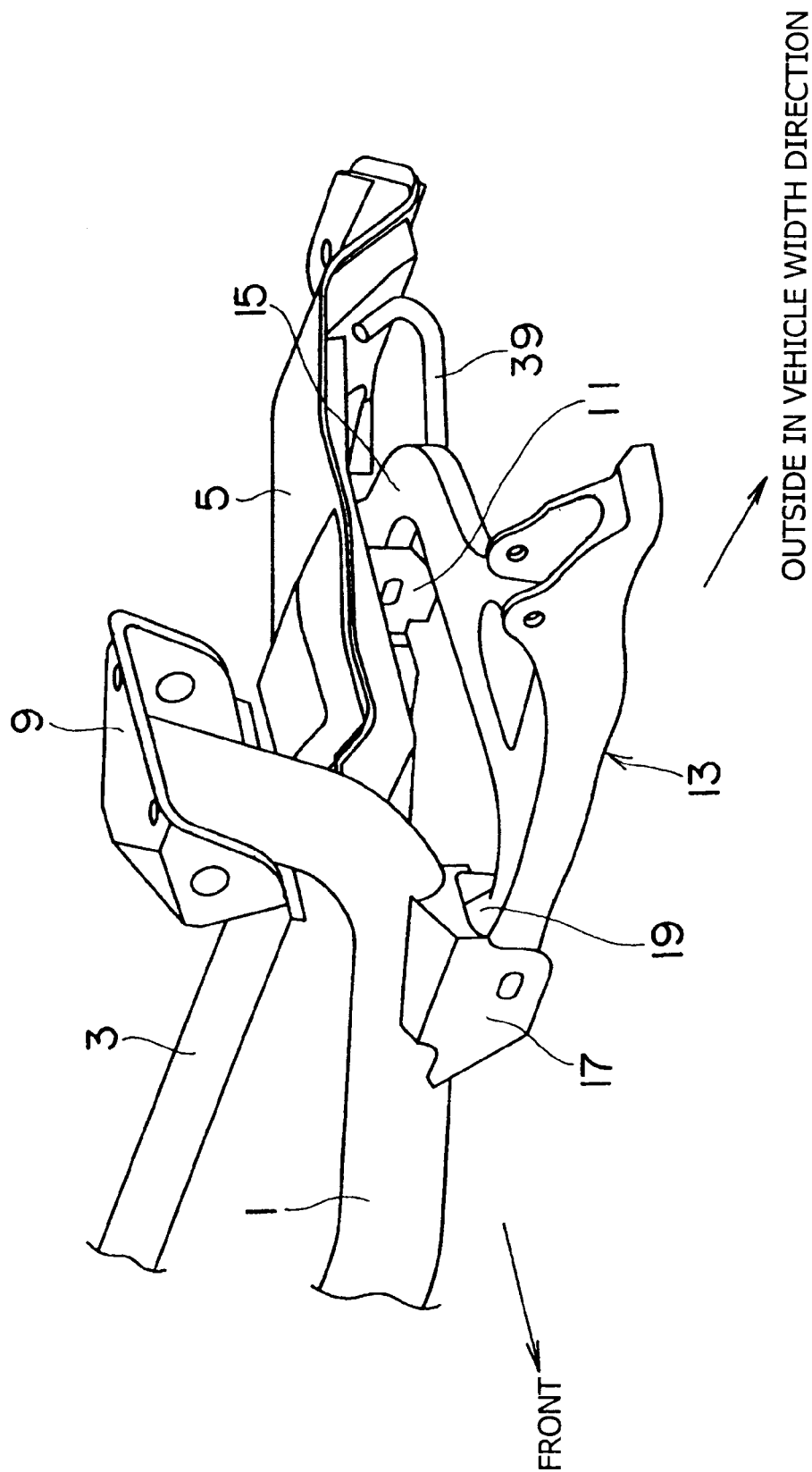
FIG. 2 is a perspective view of the subframe shown in FIG. 1, the subframe being viewed from the slant front side.
Figure 3:
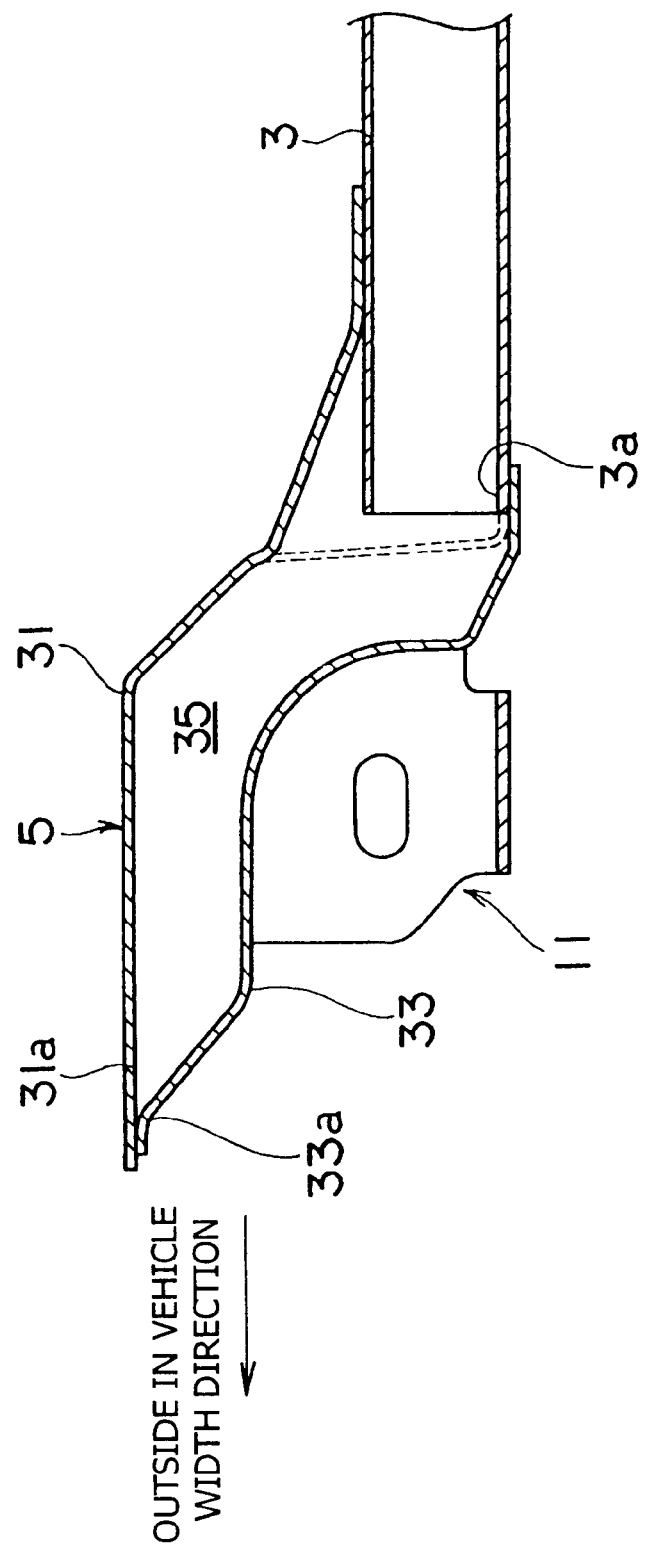
FIG. 3 is a sectional view taken along the line A—A of FIG. 1.

FIG. 2 is a perspective view showing a state in which a suspension arm 13 is disposed on the subframe body 5 and the front cross member 1, which are shown in FIG. 1, the view being taken from the slant front side of a vehicle body. A rear-side arm 15 of the suspension arm 13 is installed to the rear arm bracket 11 disposed under the subframe body 5, and a front-side arm 19 of the suspension arm 13 is supported on the front cross member 1 via a front arm bracket 17.

Figure 4:
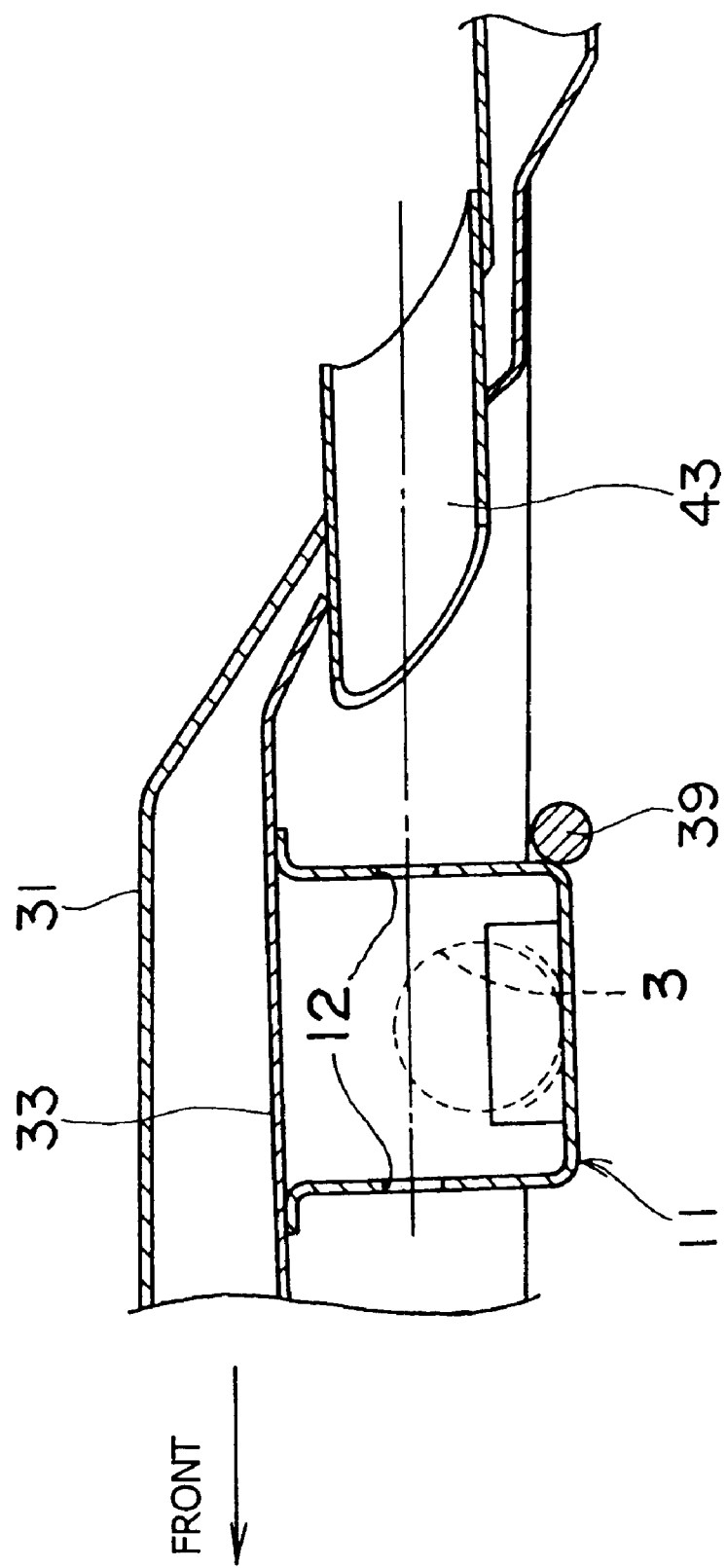
FIG. 4 is a sectional view taken along the line B—B of FIG. 1.
Figure 5:
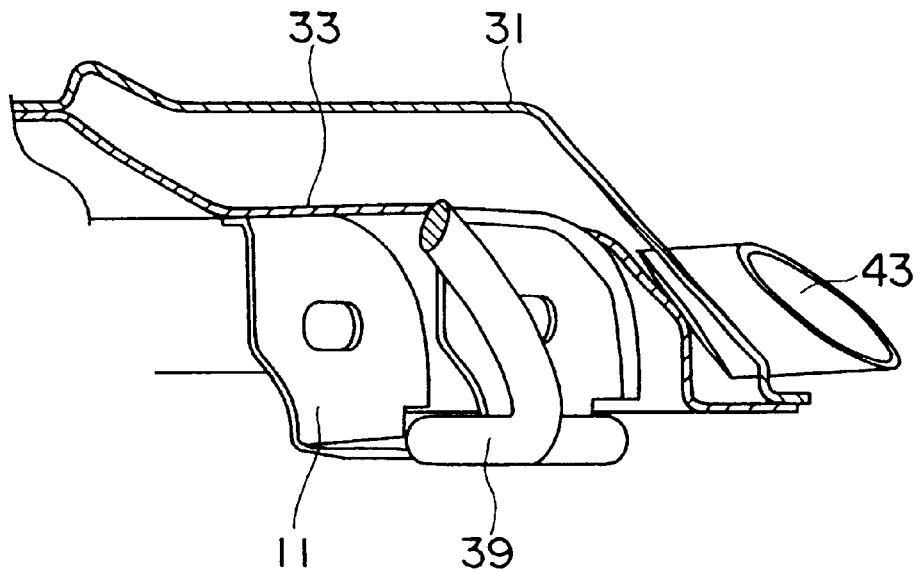
FIG. 5 is a sectional view taken along the line C—C of FIG. 1.
Figure 6:
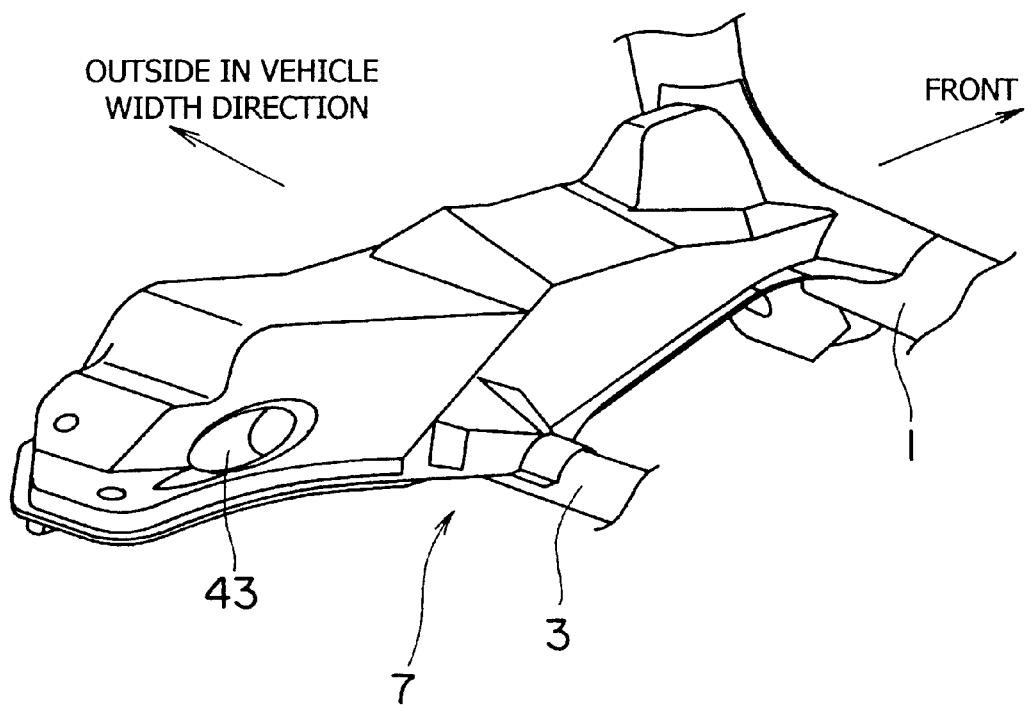
FIG. 6 is a perspective view of the subframe shown in FIG. 1, the subframe being viewed from the slant rear side.

As shown in FIGS. 3 to 6, the subframe body 5 is formed by joining peripheral portions 31a and 33a of an upper panel 31 and a lower panel 33 to each other, and a hollow portion 35 of a closed cross section construction is formed by the upper panel 31 and the lower panel 33. Also, the cylindrical rear cross member 3 is disposed on the inside in the vehicle width direction of the subframe body 5, and the rear arm bracket 11 is disposed on the face on the lower side and on the outside in the vehicle width direction of the lower panel 33. As shown in FIG. 4, a reinforcing pipe 43 is arranged so that the axis thereof passes substantially through the centers of mounting holes in the rear arm bracket 11.

Figure 7:
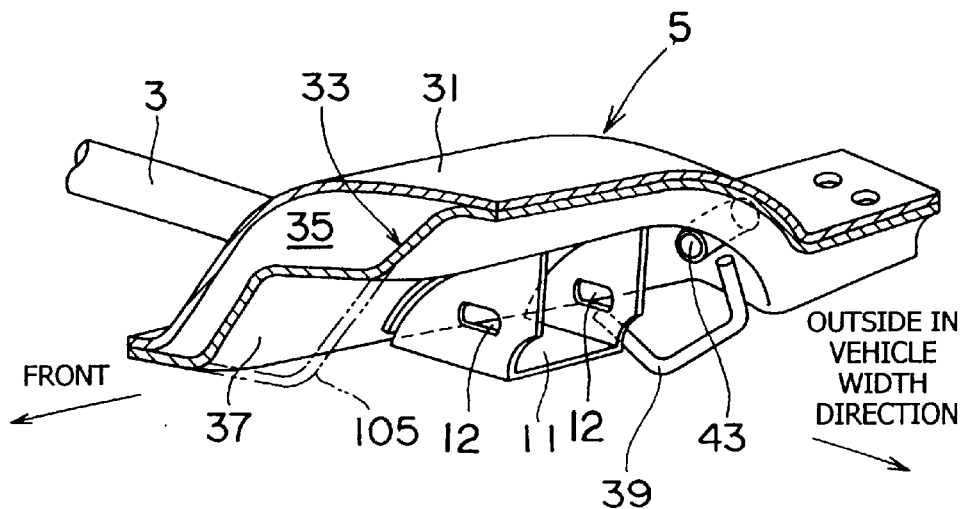
FIG. 7 is a sectional view of the rear inside of a subframe in accordance with the present invention.

As shown in FIG. 7, the upper panel 31 in accordance with the present invention has almost the same shape as that of the conventional one, and the lower panel 33 has a lower face 37 formed by depressing a lower side portion of a conventional lower panel 105 (indicated by two-dot chain lines) toward the inside in the vehicle width direction. Specifically, although the cross-sectional shape of a hollow portion of a conventional subframe body is substantially a parallelogram, the subframe body 5 in accordance with the present invention has the hollow portion 35 formed so as to have a substantially chevron shape in cross section by depressing the lower side portion of the conventional lower panel 105.

Figure 8:
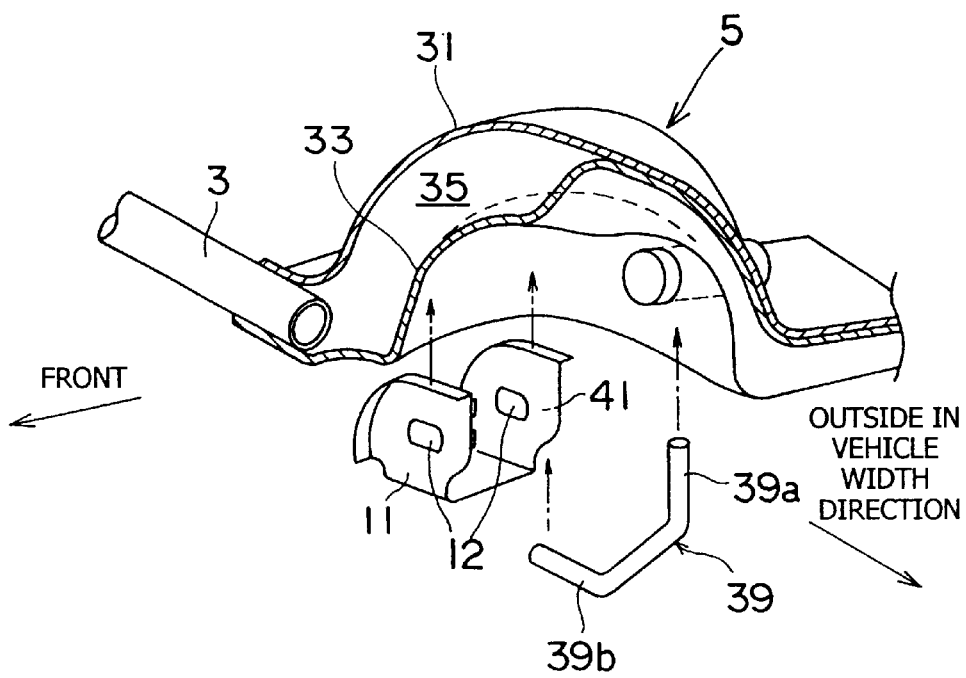
FIG. 8 is a sectional view of the rear corner portion of a subframe in accordance with the present invention.

The rear arm bracket 11 is installed on the rear side of the subframe body 5. FIG. 8 is a perspective view in which a portion in which the rear arm bracket 11 is installed is cut. As shown in FIG. 8, the rear part of the subframe body 5 is formed substantially into a spherical shell shape which is formed by dividing a hemisphere opening downward into about one-fourth and whose front side and outside in the vehicle width direction are open. To the rear end face of the lower panel 33 is joined a rear end portion 39a of a tie down hook 39 formed into a rod form by arc welding or other means. The rear arm bracket 11 is joined to the face on the inside in the vehicle width direction of the lower panel 33, and a front end portion 39b of the tie down hook 39 is joined to a rear face 41 of the rear arm bracket 11.

The following is a description of an example of a procedure for constructing the subframe body 5.

Figure 9:
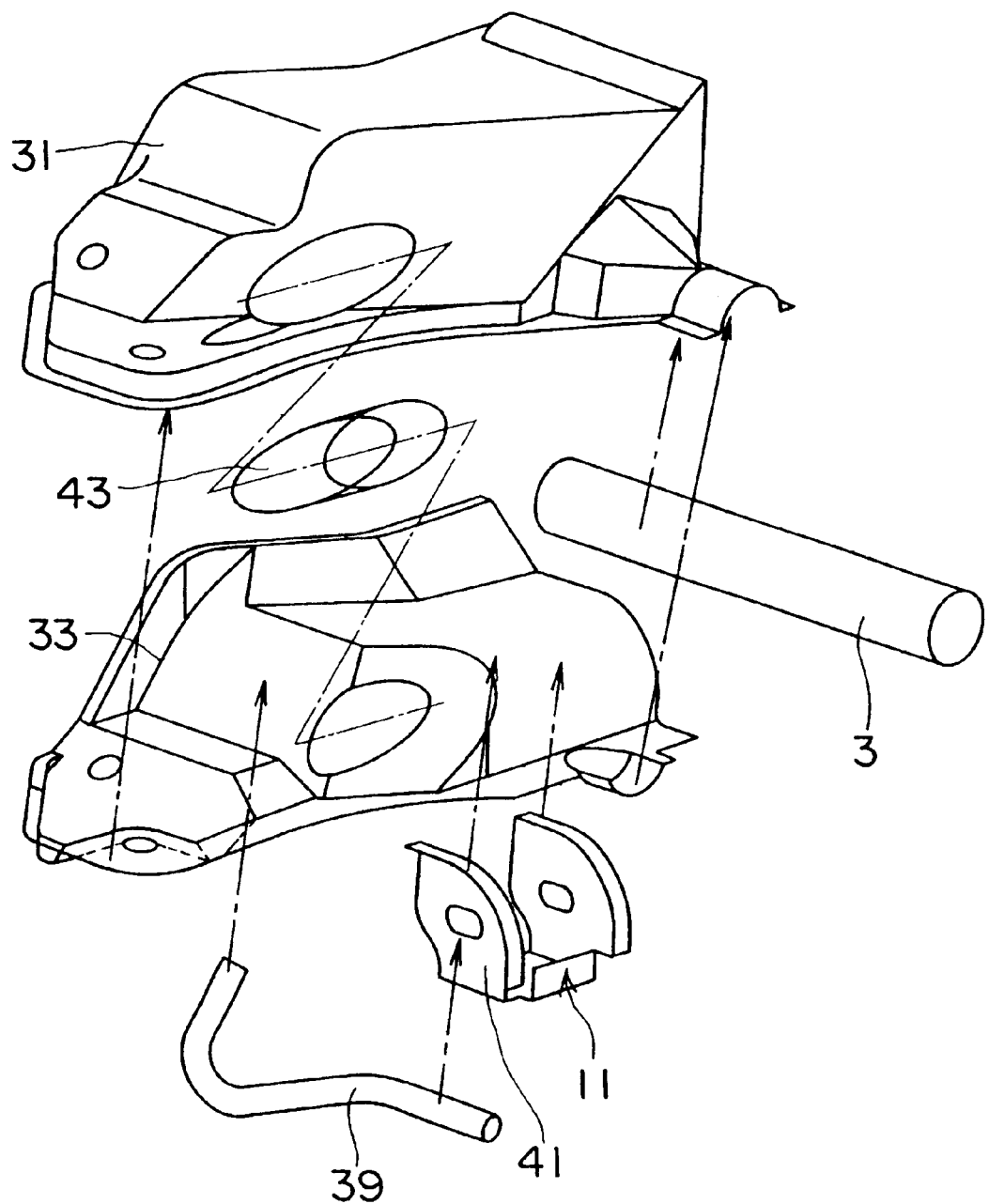
FIG. 9 is an exploded perspective view of a subframe body in accordance with the present invention.
Figure 10:
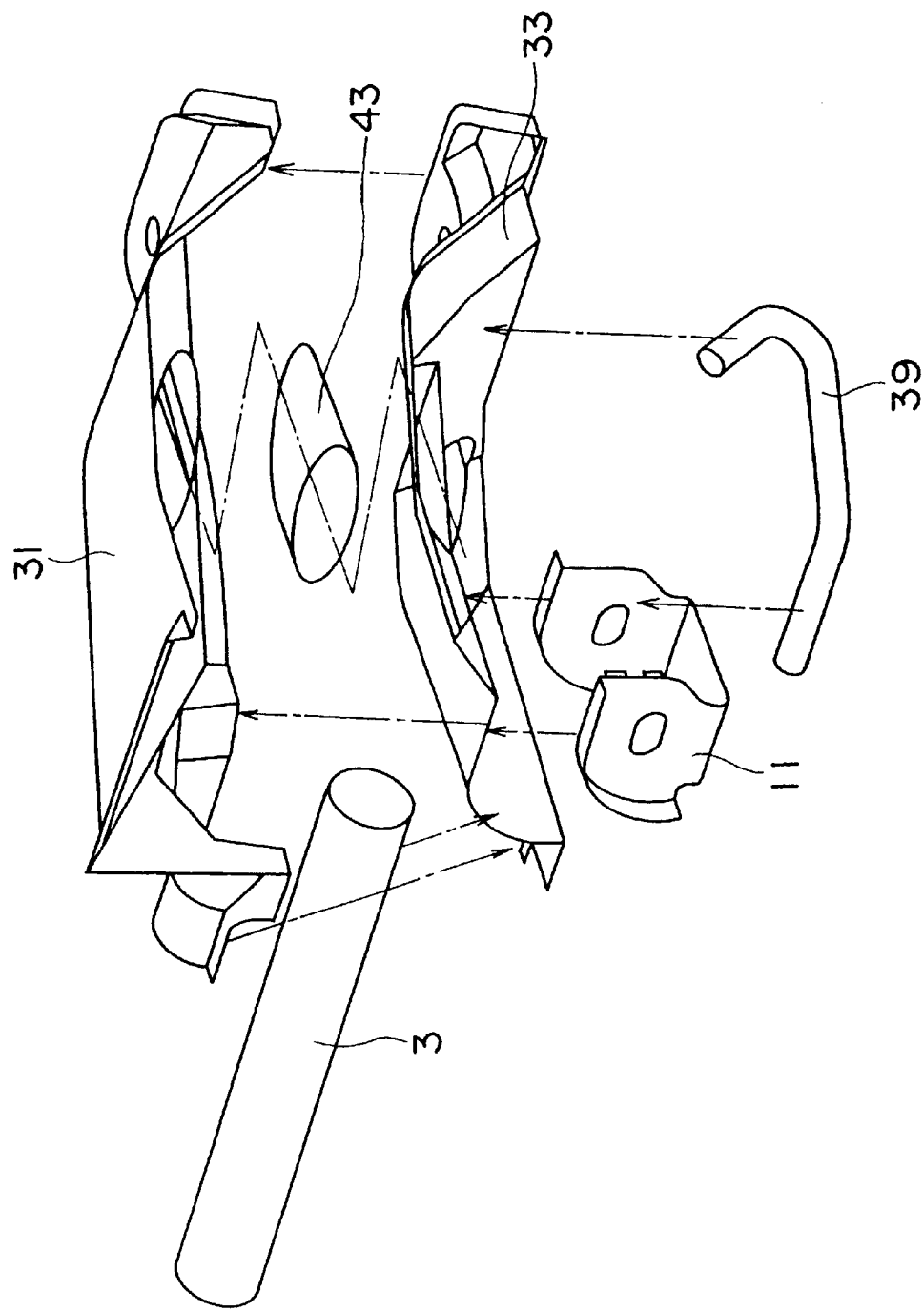
FIG. 10 is an exploded perspective view of a subframe body in accordance with the present invention.

As shown in FIGS. 9 and 10, the peripheral portions 33a and 31a of the lower panel 33 and the upper panel 31 are joined to each other. At this time, the rear cross member 3 is disposed on the inside in the vehicle width direction, and the reinforcing pipe 43 is provided between the lower panel 33 and the upper panel 31. The rear arm bracket 11 is installed from the lower side of the lower panel 33, and the tie down hook 39 is installed so as to connect the rear arm bracket 11 to the lower panel 33, by which the subframe 7 shown in FIG. 6 can be constructed.

Next, the operation of the subframe construction for a front suspension will be explained.

On a vehicle provided with the subframe 7 constructed as described above, when a load is applied to a front tire, a load imposed on the subframe 7 can be distributed effectively.

Figure 11:
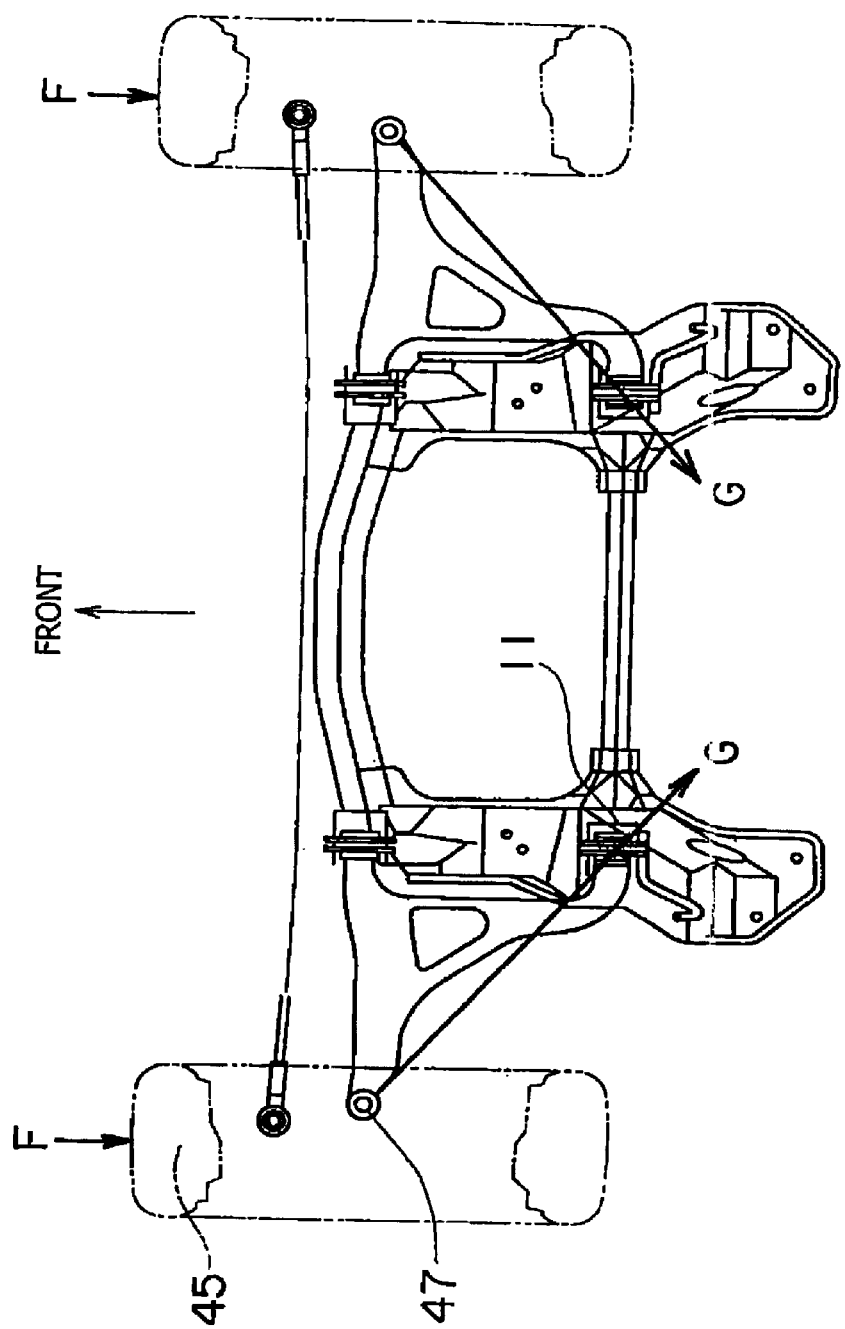
FIG. 11 is a conceptual view showing a state in which a load is applied to a subframe in accordance with the present invention by a front collision.

Specifically, as shown in FIG. 11, an impact load F applied to a front tire 45 is first imposed on an attachment point 47 of the suspension arm 13. The load is transmitted from the attachment point 47 to the rear arm bracket 11 via the suspension arm 13. This load G acts in the direction of about 45 degrees with respect to the subframe body 5 as shown in FIG. 11. Since the rear side and the inside in the vehicle width direction of the subframe body 5 is formed substantially into a spherical shell shape as explained with reference to FIG. 8, the load G applied to the rear arm bracket 11 can be taken by the subframe body 5 while being distributed uniformly. Also, part of the load G is also applied to the tie down hook 39 fixed to the rear arm bracket 11 and the reinforcing pipe 43 connecting the upper panel 31 and the lower panel 33 to each other so that the load G is distributed. Therefore, the strength of the subframe 7 can be increased as a whole.

Also, since the lower part of the lower panel 33 is depressed toward the inside in the vehicle width direction, and thus the rear arm bracket 11 can be installed at a position closer to the inside in the vehicle width direction, the length of the suspension arm 13 can be increased. Further, even when the rear arm bracket 11 is located closer to the inside in the vehicle width direction, the height from the road surface is not changed, so that a downward offset with respect to the vehicle body side attachment portion does not increase. Also, since the reinforcing pipe 43 is disposed longitudinally at the rear of the rear arm bracket 11, and the axis of the reinforcing pipe 43 is substantially aligned with the centers of the mounting holes 12 in the rear arm bracket 11, a socket wrench extension can be passed through the inside diameter face of the reinforcing pipe 43.

The present invention is not limited to the above-described embodiment, and various changes and modifications can be made based on the technical concept of the present invention.

Figure 12:
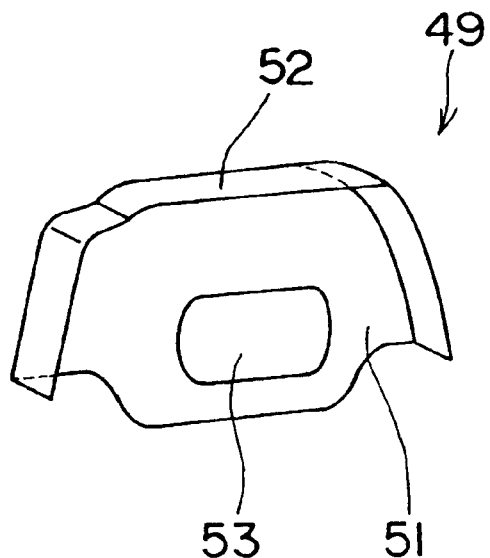
FIG. 12 is a perspective view showing a modification of a tie down hook.
Figure 13:
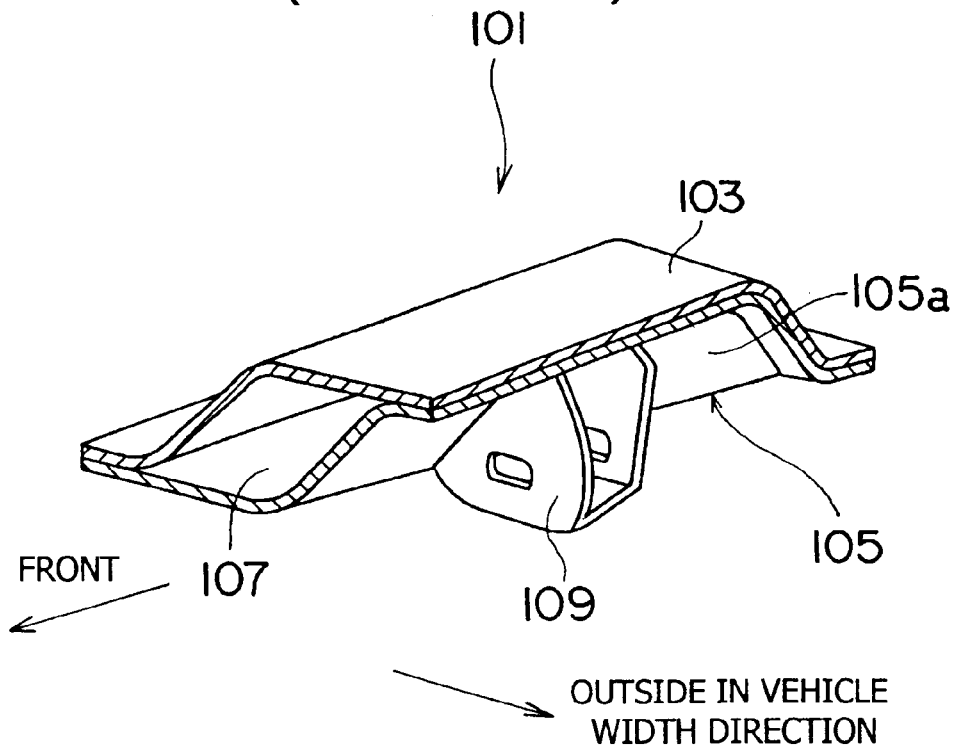
FIG. 13 is a sectional view of a subframe having a conventional construction.

For example, the tie down hook 39 is not limited to a rod-like one as shown in FIGS. 9 and 10, and may be a bracket-like one as shown in FIG. 12. This bracket-like tie down hook 49 is constructed of a plate-like body face 51 disposed vertically and a mounting flange 52 formed by bending the upper edge of the body face 51 to the side, and a transversely elongated hook hole 53 is formed in the body face 51.

By changing the plate thickness and material of the tie down hook 49, resistance to rearward movement of the front tire 45 caused by an impact from the front can be adjusted. Specifically, the center of the rear cross member 3 and the center of the rear arm bracket 11 shift slightly from each other in the vertical direction, so that the moment such as to warp the central portion of the rear cross member 11 upward is produced.

What is claimed is:

1. A subframe construction for a front suspension of a vehicle, comprising:
    a front cross member disposed in a vehicle width direction along a front part of a vehicle body;
    a rear cross member disposed in the vehicle width direction along a rear side of said front cross member;
    a pair of right and left subframe bodies for connecting said front and rear cross members to each other, each of said subframe bodies having an upper panel and a lower panel forming a hollow portion therebetween; and
    a suspension are mounting member mounted to a rearward portion of an outer surface in the vehicle width direction of each of said lower panels of said subframe body;
    wherein a portion of said upper panel and lower panel ranging from the lower panel surface on which said suspension arm mounting member is mounted on said lower panel to a rearward portion of said lower panel is formed into a substantially spherical shell shape.

2. The subframe construction for a front suspension according to claim 1, wherein a lower side portion of a mounting face of said lower pane formed into a substantially spherical shell shape is depressed inwardly toward the vehicle width direction, and said suspension arm mounting member is installed on the depressed panel face.

3. The subframe construction for a front suspension according to claim 1, wherein a longitudinal portion of the panel face on which said suspension arm mounting member is installed is substantially aligned with the position of said rear cross member.

4. The subframe construction for a front suspension according to claim 1, wherein said suspension arm mounting member and a panel face of said lower panel located along the rear side of said mounting member are connected to each other by a first reinforcing member.

5. The subframe construction for a front suspension according to claim 4, wherein a panel face of said lower panel located along the rear side of said suspension arm mounting member and said upper panel are connected longitudinally to each other by a second reinforcing member.

6. The subframe construction for a front suspension according to claim 5, wherein said second reinforcing member is a cylindrical reinforcing pipe.

7. The subframe construction for a front suspension according to claim 4, wherein said first reinforcing member is a rod-like or plate-like tie down hook.

* * * * *